Feb. 15, 1944.　　　A. ZWALD　　　2,341,753
AUTOMATIC BRAKE
Filed Oct. 9, 1941　　　2 Sheets-Sheet 1
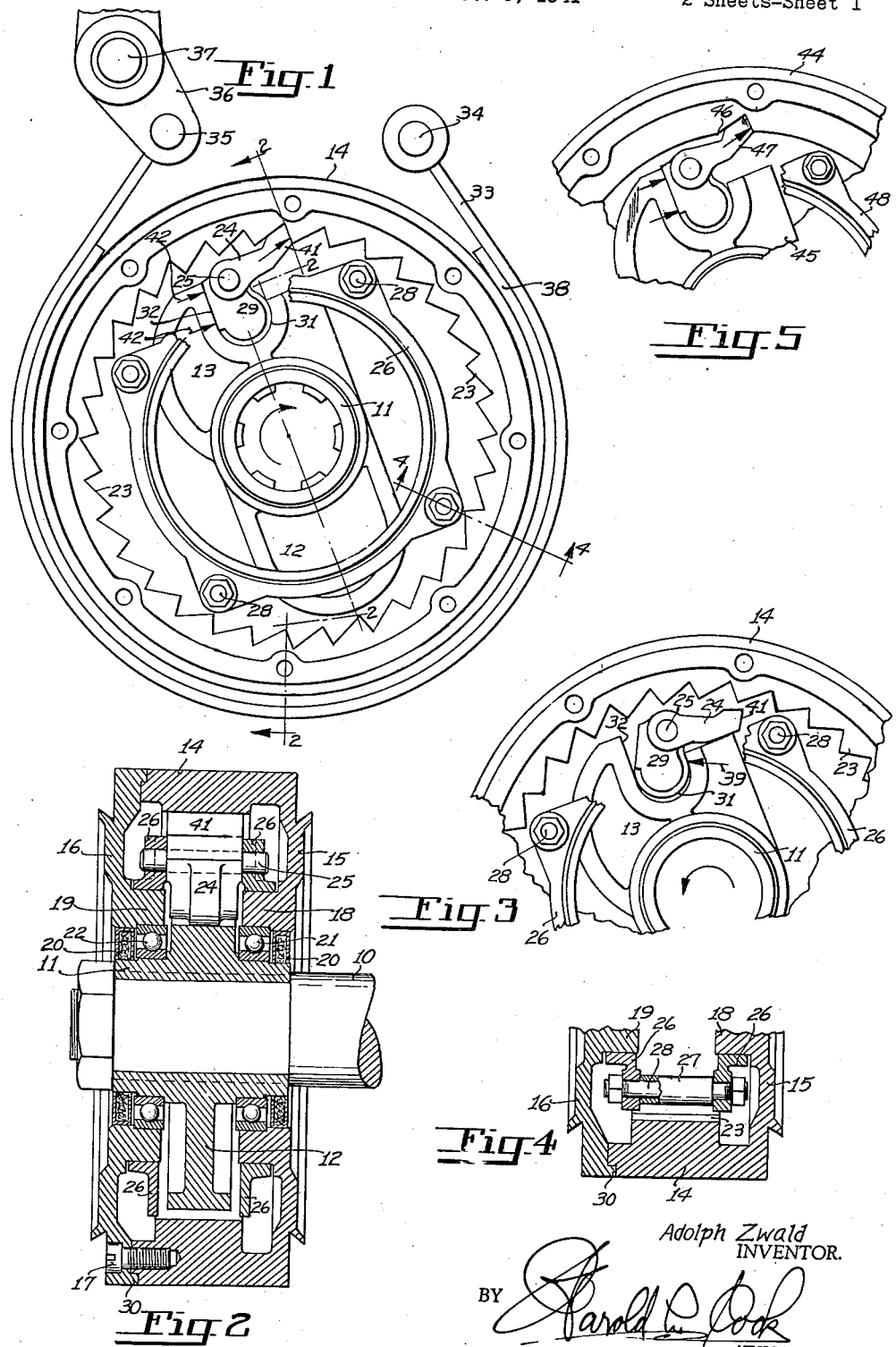
Adolph Zwald
INVENTOR.
BY *Harold P. Cook*
ATTORNEY Feb. 15, 1944.    A. ZWALD    2,341,753
AUTOMATIC BRAKE
Filed Oct. 9, 1941    2 Sheets-Sheet 2
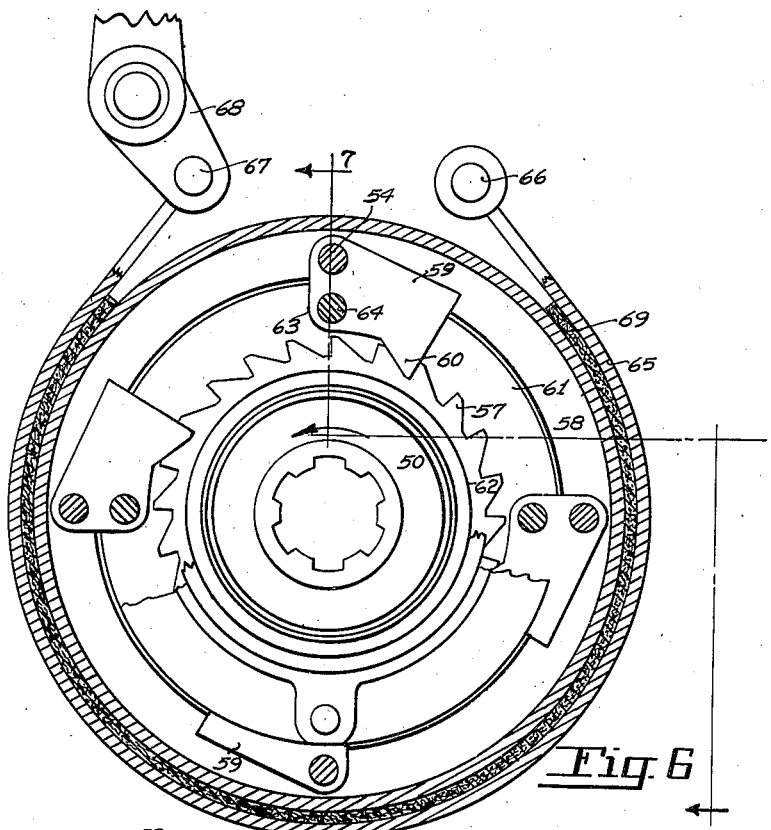
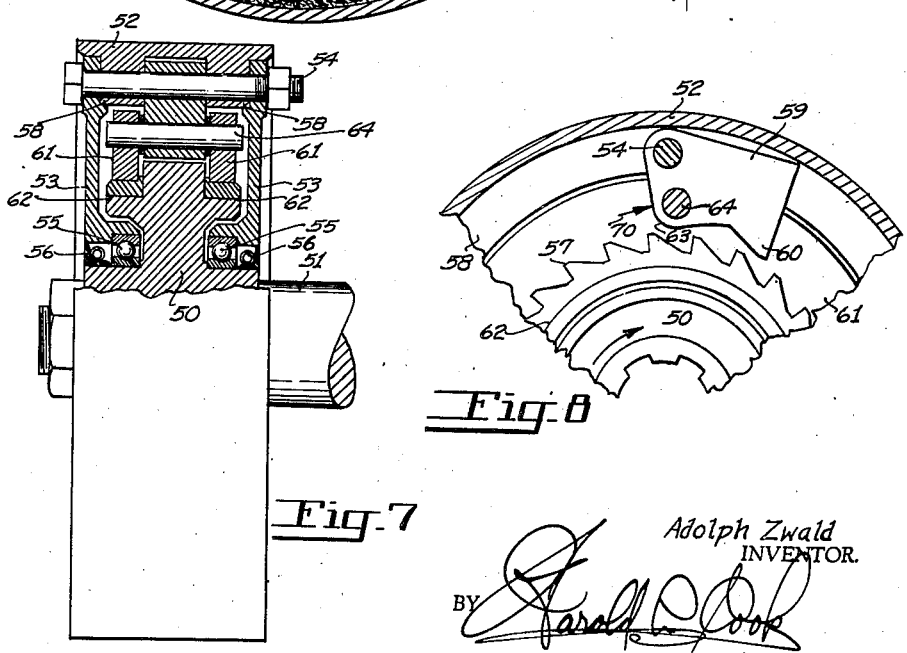
Adolph Zwald
INVENTOR.
BY
ATTORNEY

UNITED STATES PATENT OFFICE 2,341,753

AUTOMATIC BRAKE

Adolph Zwald, Portland, Oreg.

Application October 9, 1941, Serial No. 414,237

14 Claims. (Cl. 188—81)

The present invention relates to automatic brakes, and more particularly to devices of the type adapted to be mounted upon a shaft and operable to allow free rotation of the shaft in one direction and to prevent or retard rotation of the shaft in the opposite direction.

Automatic brakes of the type mentioned are particularly applicable for use in connection with power operated towing or lifting winches. In such an application, the brake may be mounted either directly upon the end of the shaft carrying the cable drum or upon an auxiliary shaft geared to the drum or to the driving connection therefor. The brake operates in such a manner as to allow free rotation of the drum as the cable is being wound up as when hoisting or pulling a load, and to prevent rotation of the shaft in the opposite direction in the event of failure of power or failure of the driving connection. The brake may also be used for retarding the reverse movement of the drum as when the load is being lowered into position.

It is an object of the present invention to provide a new and improved brake structure of the type described which is of a simplified, compact and rugged design.

It is a further object of the invention to provide a new and improved brake unit adapted to be fixedly mounted upon a shaft, the unit being so constructed that the working parts are totally enclosed.

It is a still further object of the present invention to provide a new and improved brake adapted to be mounted upon a shaft and which is operable to allow free rotation of the shaft in one direction and either to prevent rotation of the shaft in the opposite direction or to allow rotation in such direction with a predetermined resistance offered to the turning moment.

It is a further object of the invention to provide a brake unit adapted to be mounted upon a shaft and which is operable to allow free rotation of the shaft in one direction, and, with a requisite amount of braking power, to stop rotation of the shaft in the opposite direction at a predetermined point.

Another object of the invention is to provide a new and improved pawl arrangement in an automatic brake structure whereby upon the application of load the pawl is subjected only to compression forces.

In accordance with an illustrated embodiment of the invention, the brake is formed by a hub element adapted to be fixedly mounted upon a shaft and upon which hub is rotatably journaled a brake drum having a plurality of ratchet teeth circumferentially arranged upon the inner surface thereof. A pawl pivotally connected to a drag element rotatably journaled within the drum has one portion pivotally coupled to the hub whereby the pawl is rocked away from the ratchet teeth to allow free rotation of the hub in one direction, and whereby the pawl is moved into engagement with the ratchet teeth upon rotation of the hub in the opposite direction. A shoulder on the hub is positioned to form a seat for the end of the pawl when it is moved into engagement with the ratchet teeth, by means of which, upon application of load, the pawl is placed under compression between the hub and the drum. The turning resistance of the drum is controlled by means of a brake band extending therearound and which may be adjusted so as either to prevent entirely the rotation of the shaft in the predetermined direction or merely to apply a predetermined resistance to the turning moment of the shaft. The structure of the drum is such that the working parts of the brake device are totally enclosed therewithin so as to prevent the entrance into the interior of the unit of foreign matter which might interfere with the normal operation thereof. Being thus enclosed, the unit may be partially filled with oil to insure at all times proper lubrication of the various bearing surfaces.

Additional objects and advantages of the invention will occur to one skilled in the art upon a study of the following specification, reference being had to the accompanying drawings illustrating the invention, while the principal features of novelty characterizing the invention are pointed out with greater particularity in the claims annexed to and forming a part of the specification.

In the drawings, Figure 1 is an end view of one form of an automatic brake constructed in accordance with the present invention; Figure 2 is a cross sectional view taken on the line 2—2 of Figure 1 with the cover end removed; Figure 3 is a fragmentary view of the device illustrated in Figure 1, showing the pawl in a second position of operation; Figure 4 is a fragmentary sectional view taken on the line 4—4 of Figure 1, showing the means for clamping the drag rings together; Figure 5 is a fragmentary end view of an automatic brake embodying a modification of the invention; Figure 6 is an end view, with the end wall removed, of an automatic brake embodying a second modification of the invention; Figure 7 is a cross sectional view of the structure taken on the line 7—7 of Figure 6; and Figure 8 is a fragmentary view of the device illustrated in Figure 6, showing the pawl in a second position of operation.

Referring to the drawings, an automatic brake is illustrated as being mounted upon the end of a shaft 10, which, for example, may be the end of a cable drum shaft of a power operated winch, though it will be obvious to those skilled in the art that the device may be otherwise mounted, depending upon the particular application or use to be made of the device.

The brake comprises a central hub 11 which is provided with an axial opening for cooperatively receiving the splined or keyed end of the shaft 10. The hub is provided with a pair of opposite radial extensions, indicated generally at 12 and 13, the purpose of which will presently appear. Rotatably journaled upon the hub 11 is a casing or drum having a cylindrical wall portion 14 and an end wall 15 integral therewith. A second removable end wall 16 is secured over the opposite end of the casing by means of a plurality of cap screws 17. The two end walls 15 and 16 are generally symmetrical and are provided with inwardly extending annular shoulders 18 and 19, respectively, defining aligned apertures for cooperatively receiving the hub 11. Arranged between the shoulders 18 and 19 and the opposite ends of the hub 11 are bearing assemblies 21 and 22, respectively, oil seals 20—20 being provided between the casing shoulders 18 and 19 and the hub 11 exteriorly of the bearings 21 and 22 for preventing leakage of oil from the interior of the casing. The removable end wall 16 is provided with a peripheral flange portion 30 for extending cooperatively into a corresponding groove provided in the adjacent edge of the outer wall 14 of the casing for imparting a rugged connection therebetween and to permit distribution of load substantially equally through the two walls 15 and 16 without subjecting the cap screws 17 to excessive shear forces.

The inner surface of the casing wall 14 between the end walls 15 and 16 is provided with a plurality of ratchet teeth 23 extending circumferentially therearound. A pawl 24 is pivotally mounted by means of a transverse pin 25 between a pair of oppositely arranged annular drag elements or rings 26—26. The drag elements 26—26 are journaled for free rotation upon the surfaces of the annular shoulders 18 and 19 of the casing end walls 15 and 16, respectively, opposite the bearings 21 and 22. The drag elements 26—26 are maintained in a proper spaced relation at points other than the pivot 25 for the pawl 24 by bolts 28 and spacer members 27. The pawl 24 is provided with a portion 29 extending generally radially toward the shaft, the end of which portion is cylindrically rounded and fits into a correspondingly rounded recess 31 in the end of the hub extension 13. The side of the radial portion 29 of the pawl opposite the tooth portion is flattened and is adapted to be cooperatively engaged by the correspondingly flattened portion 32 of the hub extension 13. The hub extension 13 back of the flattened portion 32 is adequately reinforced for resisting the forces which may be transmitted to the pawl from the shaft.

The resistance of the outer casing to the turning moment of the shaft 10 may be variably adjusted by means of a friction element arranged for cooperative engagement therewith. As illustrated, the friction element may comprise a metal band 33 adapted to be secured at one end by an anchor pin 34 to a suitable stationary support, while the other end may be secured by pin 35 to a brake lever 36, which may be suitably mounted as by pin 37 to the support. The metal band 33 may be provided with a lining 38 of any suitable material for frictionally engaging with the outer surface 14 of the brake unit casing.

In the operation of the device, assuming first that the casing is held stationary by the brake band 33 and that the shaft 10 is rotated in the counterclockwise direction as viewed in Figure 3 of the drawings: The drag rings 26—26, being journaled upon the casing shoulders 18 and 19, will also tend to remain stationary, movement being imparted thereto, however, through the transverse pin 25 by which the pawl 24 is coupled to the said rings. Rotation of the hub 11 in the counterclockwise direction imparts a turning force upon the pawl indicated by the arrow 39 in Figure 3. The inertia of the drag rings 26—26 causes the pawl to rotate upon its pivotal support 25 in the clockwise direction, and the tooth 41 is removed from the path of the ratchet teeth 23 on the casing. Such position of the pawl 24 is illustrated in the fragmentary view of Figure 3.

When the shaft 10 is rotating in the direction indicated in Figure 3, as, for example, when a cable is being wound up on the drum of a winch, the pawl 24 is removed from the path of the ratchet teeth 23 of the casing and no wear occurs therebetween. The extension 12 of the hub 11 opposite the pawl 24 provides a counterbalance for the rotating element so as to minimize vibration of the unit during free running operation.

Upon the initial impulse of the shaft to rotate in the clockwise direction, the flattened portion 32 of the hub extension 13 engages with the adjacent pawl surface and exerts a force against the pawl indicated by arrows 42—42 in Figure 1. Thus the pawl is seated in the recess 31 in such manner as to cause the pawl to be rotated about its pivot 25 into engagement with one of the ratchet teeth 23. If the casing is held stationary by application of the brake 33, the pawl tooth 41 is placed under compression and rotation of the shaft in the clockwise direction is prevented. It will be observed that no stress is imposed upon the pivot pin 25 or upon the drag rings 26—26. By releasing the brake lever 36 the turning resistance of the brake drum may be lessened as desired to permit restricted, or even free rotation of the shaft in the clockwise direction.

It will be observed that the casing comprising the outer cylindrical section 14 and the opposite end walls 15 and 16 completely encloses the working parts of the brake unit so as to prevent the entrance of dust and other foreign matter into the interior of the device which, if allowed to accumulate therein, might interfere with the normal operation of the device. To provide adequate lubrication for the various bearing surfaces of the working parts, a suitable quantity of oil may be introduced into the interior of the device through one of the filler plugs (not shown) which may also be used for checking the oil level in the device.

In Figure 5 is illustrated a structure wherein a casing 44 is rotatably journaled about a hub 45 and is provided with a tooth 46 arranged on its inner periphery. It will be appreciated that any selective number of teeth 46 may be spaced circumferentially on the inner surface of the casing. A pawl 47 is pivotally mounted upon a drag member 48 also rotatably journaled about the hub 45. Upon rotation of the hub 45 in the counterclockwise direction, as viewed in the drawings, the inertia of the drag member 48 causes the pawl 47 to rotate upon its pivotal support in a direction away from said tooth. Upon the initial impulse of the hub to rotate in the clockwise direction, the pawl is rotated into engagement with the tooth. A friction element (not shown) similar to that illustrated in Figure 1 is provided for resisting the turning moment of the casing 44, and upon application of a certain amount of frictional resistance thereto engagement of the pawl 47 with the tooth 46 may be effected to stop rotation of the hub 45 at a predetermined point.

The brake illustrated in Figures 6, 7 and 8 comprises a hub 50 provided with an axial opening for cooperatively receiving a shaft 51 to which the hub is splined or keyed. Rotatably journaled upon the hub 50 is a casing or drum having a cylindrical wall portion 52 and end walls 53—53 held in cooperative relation therewith by means of bolts 54. Arranged between the end walls and the hub 50 are bearing assemblies 55—55, oil seals 56—56 being provided exteriorly of the bearing assemblies for preventing leakage of oil from the interior of the casing. The hub 50 is circular in form and is provided at its periphery with a plurality of ratchet teeth 57 extending circumferentially therearound.

The cylindrical wall 52 of the casing is provided with inwardly extending flanges 58 between which is pivotally mounted a pawl 59 having a tooth portion 60 adapted to engage with the ratchet teeth 57 on the hub 50. Drag members 61—61 are journaled for free rotation upon the surfaces of annular shoulders 62 of the hub 50. Each pawl 59 is provided with a portion 63 extending generally radially toward the shaft by means of which the pawl is coupled to the drag member 61 by means of transverse pins 64.

The resistance of the casing to the turning moment of the hub 50 may be adjusted by means of a friction element comprising a metal band 65 adapted to be secured at one end by an anchor pin 66 to a suitable stationary support, while the other end may be secured by a pin 67 to a brake lever 68. The metal band may be provided with a lining 69 of any suitable material for frictionally engaging with the cylindrical wall 52 of the casing.

In the operation of the device, assuming first that the casing is held stationary by the brake band 65 and that the shaft 51 is rotated in the clockwise direction as viewed in Figure 8 of the drawings: The drag member 61 being journaled upon the shoulder 62 of the hub 50 will also tend to rotate with the hub, thus imparting a turning force upon the pawl 59 as indicated by the arrow 70. The tendency of the drag member 61 to rotate with the hub causes the pawl 59 to rotate upon its pivotal support 54 in the counterclockwise direction and the tooth 60 is removed from the path of the ratchet teeth 57 on the hub. Upon the initial impulse of the shaft to rotate in the counterclockwise direction as viewed in Figure 6, the rotative motion imparted to the drag members 61 causes the pawl 59 to rotate upon its pivotal support 54 in the clockwise direction and the tooth 60 is rotated into engagement with one of the ratchet teeth 57. If the casing is held stationary by application of the brake 65, rotation of the shaft in the counterclockwise direction is prevented. By releasing the brake lever 68 the turning resistance of the brake drum may be lessened as desired to permit restricted or free rotation of the shaft in the counterclockwise direction.

The brake unit is wholly contained within the casing journaled upon the central hub and is readily reversible upon the shaft for braking in either direction of rotation of the shaft, as may be required. Oil filler plugs are, therefore, provided on each of the opposite sides of the unit so as to facilitate the inspection of the quantity of lubricant contained therewithin irrespective as to the direction of mounting of the unit upon the shaft.

The brake unit, in addition to being totally enclosed, is compactly arranged in a structure of relatively small overall size so as to require a minimum of space in a particular application. The parts are all of a rugged design so as to be capable of handling extreme conditions of load.

Having described the principles of my invention in what is considered a preferred embodiment thereof, what I claim as new and desire to protect by Letters Patent is:

1. An automatic brake comprising a hub adapted to be fixedly mounted on a shaft, a member annularly surrounding said hub, said member having a plurality of teeth circumferentially arranged around an inner surface thereof, a drag element rotatably journaled on said member about said hub, a pawl pivotally mounted on said element comprising a longitudinal tooth portion adapted cooperatively to engage with the teeth of said member, said pawl having a portion coupled to said hub for pivotal movement thereby, a portion of said hub adapted to engage with said pawl at the pivotal end of said longitudinal tooth portion whereby said pawl is placed under compression upon transmission of load between said hub and said member.

2. An automatic brake comprising a hub adapted to be fixedly mounted on a shaft, a member annularly surrounding said hub and having a plurality of teeth circumferentially arranged around an inner surface thereof, a drag element rotatably journaled on said member about said hub, a pawl comprising a longitudinal tooth portion pivoted at one end upon said element, said pawl having a portion operatively coupled with said hub whereby said pawl tooth portion is moved into engagement with the teeth of said member upon rotation of said hub in one direction and away from said teeth upon rotation of said hub in the opposite direction, said hub including means for engaging said pawl when said pawl is moved into engagement with the teeth of said member so that load is transmitted from said hub to said member only through said longitudinal pawl tooth portion.

3. An automatic brake comprising a hub adapted to be fixedly mounted on a shaft, a member annularly surrounding said hub, said member having a plurality of teeth circumferentially arranged around an inner surface thereof, a pair of drag rings rotatably journaled on said member about said shaft in an axially spaced relation, a pawl comprising a longitudinal tooth portion pivotally mounted between said drag rings, said pawl having a portion operatively coupled to said hub, said hub including a portion for cooperatively engaging the end of said pawl tooth portion whereby load may be transmitted through said pawl to said member substantially without stressing said drag rings or the pivotal connection of said pawl with said rings.

4. An automatic brake comprising a hub adapted to be mounted on a shaft, a cylindrical casing surrounding said hub, said casing having a plurality of teeth circumferentially arranged around the inner surface thereof, a drag element rotatably mounted within and journalled on said casing around said shaft, a pawl pivotally mounted on said drag element, said pawl having a portion operatively coupled with said hub whereby said pawl is moved into engagement with said teeth during rotation of said hub in one direction and away from said teeth upon rotation of said hub in the opposite direction, and means for frictionally engaging said casing for resisting the turning moment of said casing.

5. An automatic brake comprising a hub adapted to be fixedly mounted on a shaft, a casing comprising a cylindrical portion and opposite end walls, said end walls having inturned annular shoulders defining aligned central apertures, bearings arranged between said shoulders and said hub, annular drag rings journaled on said shoulders on the opposite sides thereof with respect to said bearings, a pawl pivotally mounted between said rings, said pawl having one end coupled to said hub, a tooth provided on the inner surface of said cylindrical casing portion for engagement by said pawl upon rotation of said hub in a predetermined direction, and means for frictionally engaging the outer surface of said casing.

6. A brake comprising a hub having a radial extension, a casing having an outer cylindrical portion provided with a plurality of circumferentially arranged teeth on the inner surface thereof and a pair of opposite end walls, said end walls being rotatably journaled on said hub on opposite sides of said extension, an annular drag element rotatably journaled on one of said casing walls, a pawl pivotally connected to said drag element and having an end portion coupled to said hub extension, said pawl being movable into engagement with said teeth upon rotation of said hub in one direction and away from said teeth upon rotation of said hub in the opposite direction, and means for frictionally engaging the outer surface of said cylindrical casing portion for resisting the turning moment of said casing.

7. A brake comprising a hub, a casing rotatably journaled on said hub, said casing having a plurality of teeth circumferentially arranged around the inner surface thereof, a drag element rotatably journaled on said casing about said hub, a pawl pivotally connected to said element, said pawl having an end portion operatively coupled to said hub whereby said pawl is moved toward said teeth during rotation of said hub in one direction and away from said teeth upon rotation of said hub in the opposite direction, and means for frictionally engaging the outer surface of said casing.

8. A brake comprising a hub adapted to be mounted on a shaft, a drum rotatably journaled on said hub, a plurality of teeth circumferentially arranged on the inner surface of said drum, an annular drag member rotatably journaled on said drum, a pawl pivotally secured to said member and having one end adapted cooperatively to engage with said teeth, a second portion pivotally coupled with said hub whereby said pawl is moved toward said teeth during rotation of said hub in one direction and away from said teeth upon rotation of said hub in the opposite direction, and means arranged around said drum for frictionally engaging the outer surface thereof for resisting the turning moment of said casing.

9. A brake comprising a hub adapted to be mounted on a shaft, a drum rotatably journaled on said hub, drag means arranged within and journaled on said drum, a pawl connected to said drag means and movable into one position for preventing relative movement between said hub and drum during rotation of said hub in one direction and movable to a second inoperative position upon rotation of said hub in the opposite direction, and means for frictionally engaging said drum for resisting the turning moment of said drum.

10. A one way brake comprising a hub, a casing rotatably journaled relative to said hub, drag means journaled on said casing and having a pawl connected thereto arranged within said casing and operative to lock said hub and casing together during rotation of said hub in one direction and automatically movable to an inoperative position upon rotation of said hub in the opposite direction, and means arranged for frictionally engaging said casing.

11. An automatic brake comprising a hub adapted to be mounted on a shaft, a cylindrical casing rotatably journaled relative to said hub, said casing having a tooth arranged upon the inner surface thereof, a drag element rotatably mounted within and journaled on said casing around said shaft, a pawl pivotally mounted on said drag element, said pawl having a portion operatively coupled with said hub whereby said pawl is moved into engagement with said tooth during rotation of said hub in one direction and away from said tooth upon rotation of said hub in the opposite direction, and means arranged for frictionally engaging said casing.

12. An automatic brake comprising a hub adapted to be mounted on a shaft, a cylindrical casing rotatably journaled on said hub, an inertia member within said casing rotatably journaled on said casing for movement relative to said hub and said casing, pawl means pivotally connected to said inertia member and operable thereby upon movement of said hub in one direction for effectively locking said hub and casing together and operable thereby upon movement of said hub in the opposite direction for shifting said pawl to an inoperative position, and means for frictionally engaging said casing.

13. An automatic brake unit comprising a hub, a cylindrical casing journaled on said hub, a drag ring journaled on said casing for movement relative to said casing and said hub, pawl means operatively connected to said drag ring, notched means adapted to be engaged by said pawl means upon rotation of said hub in one direction for effectively locking said hub and casing together, said pawl means being shifted away from said notched means upon rotation of said hub in the opposite direction, and means for frictionally engaging said casing for restraining said casing against rotation.

14. An automatic brake unit comprising an inner hub member, an outer cylindrical casing member journaled on said hub member, a drag ring journaled on said casing member about said hub member for movement relative to said casing and hub members, pawl means pivotally connected to said drag ring and to a first of said members, notched means on the second of said members, said drag ring effecting pivotal movement of said pawl means into engagement with said notched means upon rotation of said hub member in one direction for effectively locking said hub and casing members together, said drag ring effecting pivotal movement of said pawl means away from said notched means upon rotation of said hub member in the opposite direction, and means for restraining said casing member against rotation.

ADOLPH ZWALD.